US008621948B2

(12) United States Patent
Pellegrini

(10) Patent No.: US 8,621,948 B2
(45) Date of Patent: Jan. 7, 2014

(54) DRIVE DEVICE FOR ENTRANCE/EXIT DEVICES WITH COUPLING

(75) Inventor: Andreas Pellegrini, Edermünde (DE)

(73) Assignee: Gebr. Bode GmbH & Co. KG (DE)

( * ) Notice: Subject to any disclaimer, the term of this patent is extended or adjusted under 35 U.S.C. 154(b) by 219 days.

(21) Appl. No.: 13/060,186

(22) PCT Filed: Aug. 19, 2009

(86) PCT No.: PCT/EP2009/060748
§ 371 (c)(1),
(2), (4) Date: Apr. 5, 2011

(87) PCT Pub. No.: WO2010/020665
PCT Pub. Date: Feb. 25, 2010

(65) Prior Publication Data

US 2011/0174093 A1 Jul. 21, 2011

(30) Foreign Application Priority Data

Aug. 22, 2008 (DE) ..................... 20 2008 011 200 U

(51) Int. Cl.
*F16H 27/02* (2006.01)

(52) U.S. Cl.
USPC ........ 74/89.25; 74/89.26; 74/89.38; 74/89.39

(58) Field of Classification Search
USPC ................. 74/25, 89.23, 89.25, 89.26, 89.32, 74/89.33, 89.38, 89.39, 424.81
See application file for complete search history.

(56) References Cited

U.S. PATENT DOCUMENTS 4,939,946 A * 7/1990 Teramachi ..................... 74/89.3
6,202,498 B1 * 3/2001 Schlenker .................. 74/424.85
6,237,434 B1 * 5/2001 Brown et al. ............. 74/424.82

FOREIGN PATENT DOCUMENTS

| | | |
|---|---|---|
| DE | 20316764 | 4/2005 |
| DE | 202006014936 | 2/2008 |
| DE | 202008001066 | 6/2009 |
| EP | 1040979 | 10/2000 |
| EP | 1260666 | 11/2002 |
| EP | 1314626 | 5/2003 |
| IT | 1132414 | 7/1986 |

OTHER PUBLICATIONS

International Search Report; PCT/EP2009/060748; Oct. 13, 2009.

* cited by examiner

*Primary Examiner* — David M Fenstermacher
(74) *Attorney, Agent, or Firm* — Cantor Colburn LLP

(57) ABSTRACT

The invention relates to a drive device (20) for entrance/exit devices for public transit vehicles, comprising a drive unit (22) disposed in and driving a column (24) that rotates about an axis of rotation Z-Z during opening and closing operations, said column opening and closing an entrance/exit device. The drive unit (22) is supported in the vehicle by way of a support component (40) and the support component (40) acts as a counterbearing for a torque of the drive unit (22). A coupling device (72) is disposed between the drive unit (22) and the support component (40), said coupling device facilitating a rotation of the drive unit (22) about the axis of rotation Z-Z when a limit of the torque acting on the drive unit is exceeded.

11 Claims, 9 Drawing Sheets

DRIVE DEVICE FOR ENTRANCE/EXIT DEVICES WITH COUPLING

BACKGROUND OF THE INVENTION

The invention relates to a drive device for boarding/deboarding devices for public transport vehicles.

BRIEF DESCRIPTION OF RELATED ART

Such boarding/deboarding devices are known per se, in particular for passenger doors but also for boarding ramps, retractable steps and the like on public transport vehicles. They are often disposed in the area of the door frames or door portals above an entry opening. For example, pivot sliding doors are described in EP 10 409 79 A2 and EP 13 146 26 A1. The drives shown therein are therefore particularly suitable from pivot sliding doors that carry out a pivoting displacement and a lateral displacement during the opening and closing process. Drive devices for purely rotating or pivoting doors, that is, doors that do not carry out any lateral displacement, are regularly disposed above or below the doors in the area of the door portal. DE 203 16 764 U1 also describes the arrangement of a drive device in the upper area of the door portal.

What always constitutes a disadvantage in these drive devices is that they require a considerable amount of construction space. It was also found that the assembly and adjustment of such drive devices and doors is very time-consuming.

A drive device in particular for passenger doors of a very compact constructional design is known from DE 20 2006 014 936 U1. Due to its narrow and elongate configuration it is possible to integrate the drive device into a rotation post of a passenger door. Accommodating the drive unit directly in the rotation post, apart from saving space, also has many advantages with regard to maintenance and installation of the entire drive device.

BRIEF SUMMARY OF THE INVENTION

However, one of the problems of such compact drive systems is that when larger external forces are applied to the door leaves in the opened or closed state, very large forces are exerted on the drive unit and the gear unit of the drive device via the lever arms of the door system. These forces occur particularly in the case of vandalism or in opening and closing processes in overcrowded vehicles. These large forces can lead to damage to the drive or the gear unit, for example on the opened door leaf, particularly when initiated abruptly.

The invention is based on the object of providing a drive device of the type mentioned above, which is not damaged even in the case of excessively large torques acting on the boarding/deboarding device, in particular on the passenger doors. In this case, the drive devices are moreover supposed to be constructed as robust and rugged as possible and the production and installation is supposed to be possible in a simple and cost-effective manner.

According to the invention, the object is achieved by a drive device for boarding/deboarding devices for public transport vehicles with a drive unit, which is disposed in and drives a rotation post that rotates about an axis of rotation Z-Z during opening and closing processes and opens and closes the boarding/deboarding device, wherein the drive unit is retained by a retaining component on the vehicle and the retaining component acts as a counter bearing for a torque of the drive unit, and a coupling device is disposed between the drive device and the retaining component, the coupling device enabling a rotation of the drive unit about the axis of rotation Z-Z when a threshold value of the torque acting on the drive unit is exceeded.

In such an arrangement, the torque applied is put up against a counter bearing by the drive unit being attached to a fixed component of the vehicle. It is thus possible that the output torque of the drive device can be transmitted onto the rotation post and that the latter rotates.

The invention is based on the idea that the drive device or the gear unit is protected by the entire drive unit co-rotating starting from a certain torque and thus avoiding damage. What is decisive is that the coupling device disengages only if a torque acting on the drive unit exceeds a threshold value but that the torques required for normal operation can be transmitted without any problems. The coupling device thus serves as a safety coupling for the drive unit or the gear unit.

It is crucial for the function of the coupling device that it is functionally disposed between the retaining component and the drive unit. Depending on the arrangement and configuration of the components, it may also be positioned at another location in space, for example, if the drive unit or components connected therewith extend through the retaining component.

The coupling device can be configured as a friction coupling, but a hydrodynamic or electrodynamic coupling is also conceivable. A so-called shear pin coupling, in which pins break when the threshold torque is reached, can also be used. This design is certainly useful for certain applications but is disadvantageous in that a replacement of the pins is required after the torque has been exceeded.

In a particularly simple design variant, two coupling elements each comprise latching elements, for example toothings, via which they mesh with each other and are thus able to transmit a torque. The use of coupling disks that lie on one another and are in engagement in normal operation is conceivable. A restoring force is applied on at least one of the coupling disks, for example by means of a disc spring. If the torque threshold is exceeded, the coupling disks overcome the restoring force, rotate relative to one another via flanks of the toothings, and are in the end brought out of engagement in the process. The torque cannot be transmitted anymore, and the coupling disks slide over the toothings until the torque decreases again and the latching elements come into engagement again.

In another advantageous embodiment, the coupling device is configured as a locking body coupling. This means that additional bodies are disposed between the coupling elements which transmit the torque. These may be, for example, spring-loaded balls, bolts or claws which slip from corresponding grooves upon reaching the threshold torque, thus permitting the coupling element to rotate.

It is possible in principle to configure the coupling device in such a way that it disengages only in one direction of rotation but blocks in another direction of rotation. This can be accomplished for example for the configuration of the tooth flanks or in the case of a locking body coupling of the grooves. In the latter case, the locking body, for example the ball, can be moved on a flank of a depression or groove only in one direction of rotation; in the other direction of rotation, the flank is configured to be, for example, straight, so that it blocks the movement of the ball.

Advantageously, a support of the drive device or drive unit is provided which takes into account that, due to the length of the rotation post, distortion and deflection of the same can hardly be avoided during operation. The movements of the rotation post are caused, for example, by the vehicle being compressed or twisted due to acceleration and braking processes as well as cornering. In the case of buses, the contact of tires with curbstones and similar edges leads to a deformation of the vehicle and thus, to a movement of the rotation post. Since the drive unit is fixed on a stationary component, such distortions and deflections of the rotation post can have a negative effect on the drive device. For this reason, the drive unit is connected with the retaining component via a bearing, which enables the rotation post to tumble but prevents a rotation about the axis of rotation Z-Z. Tumbling is understood to mean a deflection from the axis of rotation Z-Z in the X-direction and/or Y-direction. This function compensates, so to speak, a relative movement between the drive unit and the post.

Advantageously, a movement in the Z-direction, that is, in the direction of the axis of rotation Z-Z, is still possible. For this purpose, a guide shaft connecting the drive unit with the bearing is slidably mounted in a guide of the bearing. For transmitting the torque, the guide shaft is preferably non-circular; it can have, for example, a multi-edged or polygonal geometry.

The rotation post itself is rotatably mounted, preferably also in the same retaining component which also supports the drive unit. By using a conventional joint bearing for supporting the rotation post, the latter is able to rotate in the retaining component and at the same time can compensate deviations of position between the upper and the lower bearing in the X-direction and Y-direction. The pivot point of the guide shaft and the rotation post bearing should in this case lie in a single plane, that is, be disposed in approximately the same position of the axis of rotation Z-Z. This prevents strains and loads on the bearings and causes the movement of the drive unit and the rotation post to run as parallel as possible.

The mobile and flexible support of the drive device or the drive unit permits fitting the drive device into different vehicles. It is even conceivable to use the drive device in a rotation post with a little inclination, for example a slant of up to 5°. In addition, the moveable support helps compensating fitting tolerances, which facilitates the installation and maintenance of the entire drive device.

A ball shaft joint bearing has proved to be a particularly suitable bearing. The guide shaft is guided in a ball receptacle by means of balls. Ball-shaped depressions that keep the balls in position are disposed in the guide shaft. Corresponding elongated depressions, in which the balls are guided, are provided in the ball receptacle in the Z-direction. The position of the elongated guides in the Z-direction prevents the rotary movement about Z but at the same time enables a tumbling movement about Z-Z or a combined rotation about X and Y. Preferably, the ball receptacle can be configured in two parts.

The guide shaft can preferably have a continuous bore extending along its longitudinal axis, through which the necessary cables and similar connections can be routed. Such a bore is advantageous in that, on the one hand, space utilization is optimized, and on the other hand, the cables and connections routed therein are protected.

The drive unit can be configured and arranged in different ways. For example, the gear unit can be connected to the bearing via its output shaft as the guide shaft; however, an arrangement in which the output shaft of the drive motor, as a guide shaft, is solidly connected with the bearing is also conceivable. In the latter case, the housing of the gear unit, e.g. of the planetary gear unit, is solidly connected to the rotation post. In principle, the drive unit, in contrast to the first embodiment, is merely rotated, so that the gear unit points in the direction of the underlying ground. If current is applied to the drive motor, the housing of the drive unit rotates, so that the rotation post is made to rotate. In this embodiment, an external tube for the drive unit and the torque support in the region of the bearing can be omitted.

According to the invention, a non-self-locking drive unit or a non-self-locking reduction gear unit can be provided; the blocking action is thus not provided by the drive unit or the gear unit, but by a blocking device. Because of the weak self-locking action, a manual actuation of the boarding/deboarding devices is always ensured in the case of an emergency; only the blocking action of the blocking device must be canceled for this purpose. This results to a high degree of safety.

Since no self-locking action of the drive or the gear unit is provided, an additional blocking action of the drive is an absolute requirement. This blocking action can be effected by means of an additional braking device, which, when it is not energized, causes a mechanical lock of the drive. This brake can be released electrically or manually by hand in order to disengage the drive and thus enable electrical and/or manual operation. The manual release of the brake can take place via a known spring-loaded brake with manual release, wherein the manual release of the brake can be used for a mechanical emergency release device. Such brakes are known by the term "low active brake". However, any other suitable blocking device can be used alternatively. For example, the brake may act on the drive shaft of the drive motor by spring force, and may be electromagnetically releasable.

Alternatively, using a so-called high-active brake is also possible according to the invention. Such a brake is also known by the name armature force brake. This means that the brake is active in the energized state, and the door is fixed in this position. The precondition in this case is that the boarding door is provided with an external locking device for permanently locking the entrance securely in a vehicle that is parked for a longer period of time. This can take place, for example, by means of a remote-controlled central locking system.

In a vehicle that is parked for a shorter period of time, the door can be locked by means of the supply voltage being switched off in a delayed manner, without the external lock. In this case, the brake continues to be energized for this period of time. When the door is not locked and the supply voltage is switched off, the door is not fixed anymore and can be moved manually by hand, however, a mechanical emergency release, for example via a Bowden cable, is not required anymore. Emergency release is effected by means, for example, of an opening contact in the control line for the brake. The emergency release can be reset with simple means in a centralized or decentralized manner; for example, a decentralized reset of the emergency release out via an external relay circuit.

According to the invention, a brake may even be dispensed with entirely as a blocking device if the drive motor can be short-circuited. Thus, the door can be kept locked and be prevented from moving by means of the short circuit torque of the drive motor. This function is always ensured, even is the vehicle is standing and is not in operation. If the emergency release is actuated, the connection between the two contacts of the motor is interrupted preferably via a mechanical switch, the short circuit torque is canceled and the door can easily be opened by hand without any problems. The self-locking action of the door is thus canceled by simply disconnecting the positive and the negative line of the motor. The locking action is always present in the non-energized state of the motor, that is, a power failure does not have any altering influence on it. In the case of power failure or electronic system failure, the emergency release can always be carried out by actuating the short circuit switch. It is possible to lock the boarding/deboarding device again, in particular a door, after the interruption of the short circuit by switching the switch back.

According to the invention, the short circuit switch preferably works directly without any auxiliary power and thus, also in the case of a disused vehicle or of a power interruption.

The advantages of using such a short circuit switch on the one hand lie in the reduction of the required components for the emergency release, on the other hand, the short circuit switch can be positioned at any ergonomically favorable place; laying the otherwise commonly used Bowden cables or pneumatic lines can be dispensed with.

According to the invention, a combination of a lock on the basis of a short circuit and the use of a brake or mechanical lock is also possible. This can be the case especially if the short circuit torque is insufficient for locking the door securely.

The switchable short circuit can advantageously be ensured by special windings of the motor windings, which are exclusively provided for the purpose of generating the short circuit. An increased braking action or locking action can also be achieved by means of special windings.

Moreover, the output element of the reduction gear unit can be connected with a lift-and-turn unit, a component known per se, which is used in particular in outward-swinging doors. By lifting the door, the door leaf is connected in a positive fit with the door portal by means of lock strikers.

Advantageously, a rotary travel detection can moreover be provided. For example, this is carried out by means of an incremental value or an absolute value encoder directly on the motor shaft of the drive motor or on an output shaft for the boarding/deboarding device. For example, if the drive apparatus is used for a passenger door, the rotary travel detection can take place via the output shaft for a rotation post connection.

Detection of the rotation path via the output shaft has the advantage that possible material fractures in the drive can be recognized and signaled in the case the door opens inadvertently.

Of course, a self-locking drive unit can also be used instead of a non-self-locking design. The entire reduction gear unit, for example, can be subdivided into two individual gear units coupled with each other by a disengageable coupling. The controllable coupling can be configured as a coupling engaging under spring force, to which a manually operated emergency release device is connected.

In a particularly advantageous embodiment, the first reduction gear unit, together with the drive motor and the first coupling half, is axially connected by means of the spring force of a compression spring with the second coupling half and the second reduction gear unit. In this embodiment, the configuration on the coupling is particularly simple and can be realized with significantly fewer components. The external diameter also remains considerably smaller because the connection point of the Bowden cable is provided centrally within the housing.

If the coupling device is configured, in accordance with the invention, as a locking body coupling, a support member can be connected in a positive fit with the drive unit and rotatably attached, via a coupling bearing, to a retaining component solidly connected to the vehicle. The support member comprises axially extending depressions in which the coupling balls are seated. The coupling balls respectively extend into axially extending guides of the bearing housing, whereby a torque can be transmitted. The bearing housing is solidly connected with the retaining component of the vehicle; during normal operation, the coupling balls are held in position by a thrust plate, the thrust plate itself being in turn loaded with a spring force. It has proved to be particularly advantageous to use as flat a disc spring as possible since it has a very flat force characteristic.

In normal operation, the coupling balls remain in the depressions and guides due to the spring force, but if the torque exceeds the threshold value, the balls shift along lateral flanks of the depressions in the axial direction, causing the support member, and thus the drive unit together with the rotation post, to rotate. In this case, rotation can take place up to the next recess into which the ball is pressed due to the restoring force of the spring.

The threshold value, i.e. the torque at which the balls are able to move from out of the depressions, can be determined via the size of the force of the disc spring assembly and via the angle of the lateral flanks of the recesses. The acceptable path when exceeding the threshold value can also be predetermined by the number of the recesses. In a particularly advantageous embodiment, eight recesses with eight balls over 360° are provided, resulting in a path of 45°.

Moreover, a monitoring member can be provided which registers a disengagement of the coupling device. A switching element engaging into recesses of the support member, thus being actuated by a rotation of the support member, is conceivable. The outputting signal can, for example, present the driver with a feedback with regard to vandalism, or be otherwise evaluated in the door control.

BRIEF DESCRIPTION OF THE SEVERAL VIEWS OF THE DRAWING

The invention will be explained in more detail below with reference to the attached drawings.

In the drawings.

DETAILED DESCRIPTION OF THE INVENTION

Figure 1:
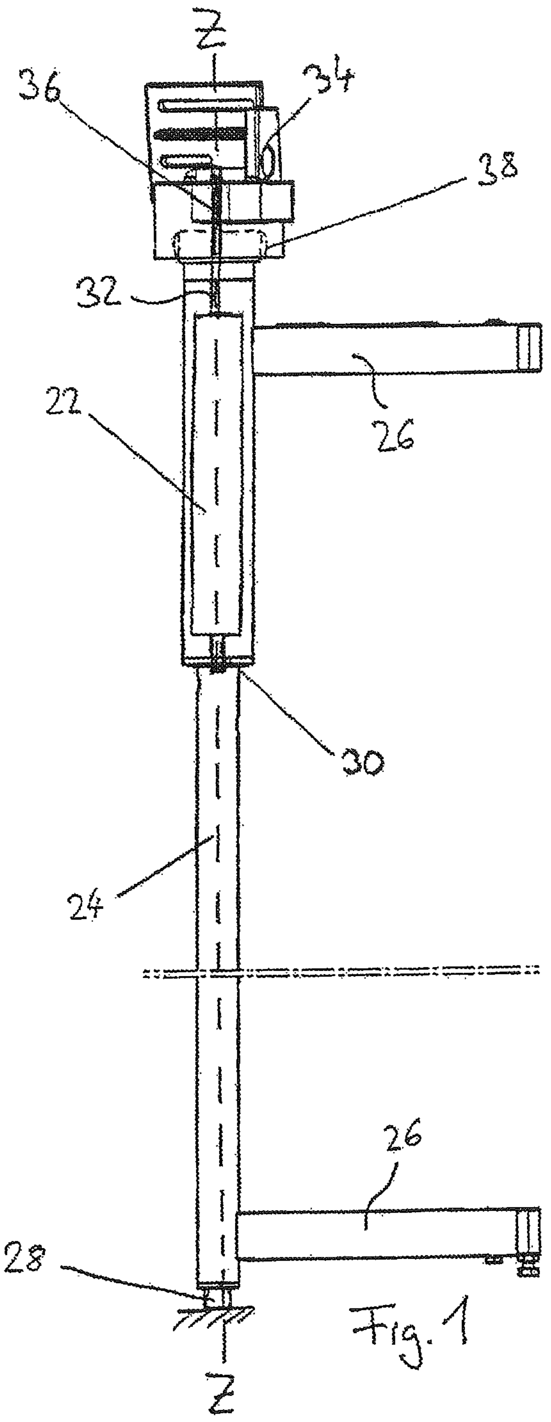
FIG. 1: shows a schematic view of a drive device.

FIG. 1 shows a drive device 20 in a simplified schematic view. The drive unit 22 is accommodated in a rotation post 24. The rotation post 24 has supporting arms 26 for attaching a door, which is not shown, and is rotatably mounted via a floor bearing 28 on an underlying ground, usually a vehicle floor. In addition, a pivot bearing 38 is shown via which the rotation post 24 is mounted rotatably about a longitudinal axis Z-Z in a bearing 34.

The drive unit 22 is non-rotatably connected with the rotation post 24 via a rotation post bearing 30 so that a rotary movement of the rotation post 24 can be effected via the rotation post bearing 30. A guide shaft 32 reaches from within the drive unit 22 into the bearing 34 and is non-rotatably connected with the latter via a drive unit bearing 36. The drive unit bearing 36 can, for example, be configured as a ball shaft joint bearing and serves for receiving the torque of the drive unit 22, which in turn is solidly connected to a retaining component 40 (see FIGS. 4 and 5.

Figure 2:
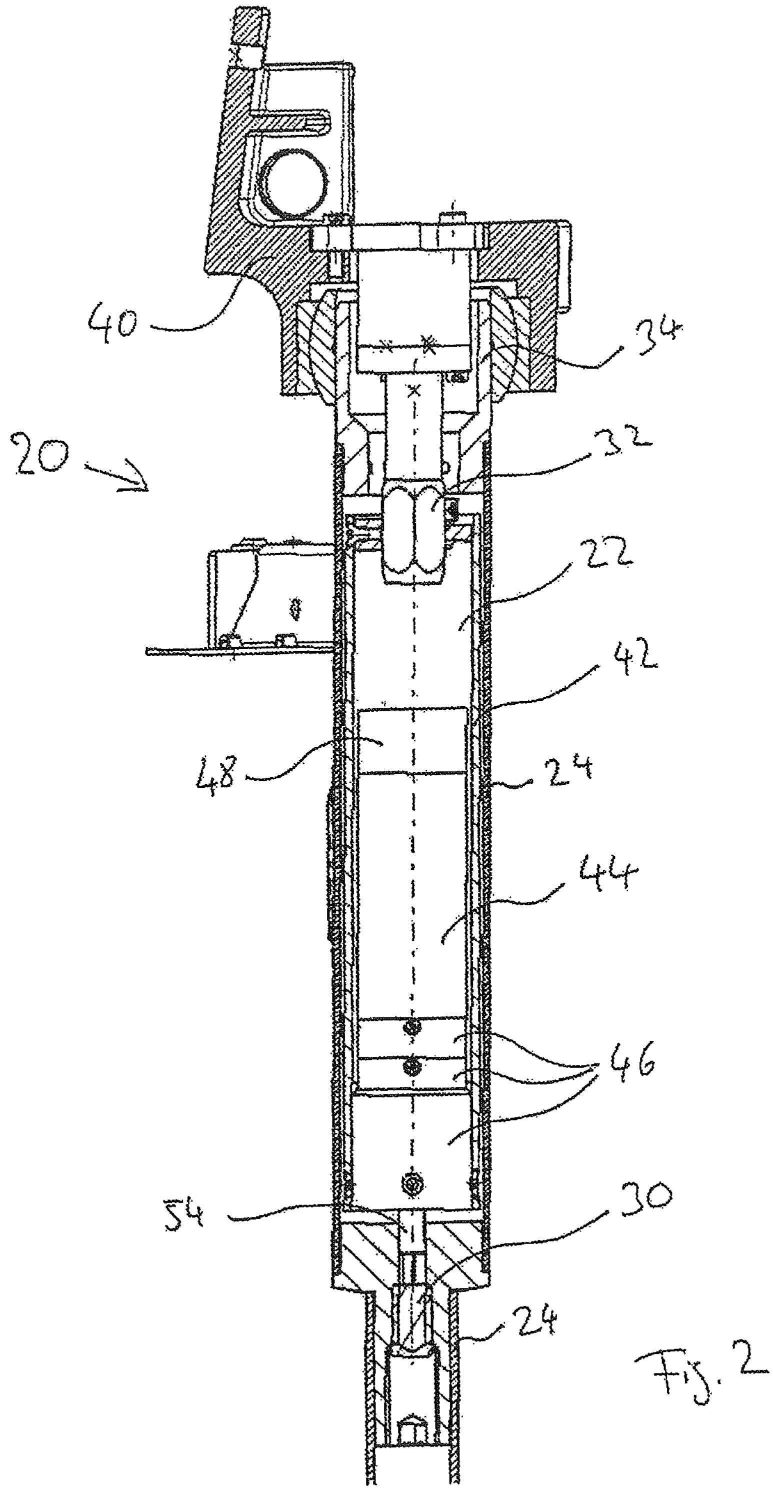
FIG. 2: shows a schematic axial section of an exemplary embodiment of a drive unit for boarding/deboarding devices.

FIG. 2 shows a drive unit 22, for example for a passenger door, configured as a compact drive and disposed in the rotation post 24 in which an electrical drive motor 44 and a reduction gear unit 26, which is shown as a three-part planetary gear unit, are disposed in the axial direction one behind the other within a slim housing 42 formed in a tubular manner. The drive motor 44 is adjoined by a brake 48, which is also accommodated within the housing 42 and which can be configured as a "low active brake" that engages under spring force and can be disengaged electromagnetically and mechanically, or as a "high active brake". The reduction gear unit 46 is configured to be non-self-locking.

An output element of the drive motor 44, which is not visible, is connected with an input element of the reduction gear unit 46, which is also not visible, the output shaft 54 guide shaft 32 of which being connected, via the rotation post bearing 30, with the rotation post 24. The rotation post 24 tapers below the drive unit 22.

The guide shaft 32 extends from within the housing 42 into the bearing 34, with the bearing being connected to the retaining component 40 of the vehicle.

The torque generated by the drive motor 44 is transmitted via the reduction gear unit 46 onto the gear output shaft 54. In case of an emergency, only the brake 48 must be released, after which the manual actuation of the passenger door is readily possible due to the lack of self-locking action of the reduction gear unit 46.

Instead of or in addition to the brake 48, a short circuit device can also be provided for locking, which short-circuits the motor windings of the drive motor 44 for locking.

Figure 3:
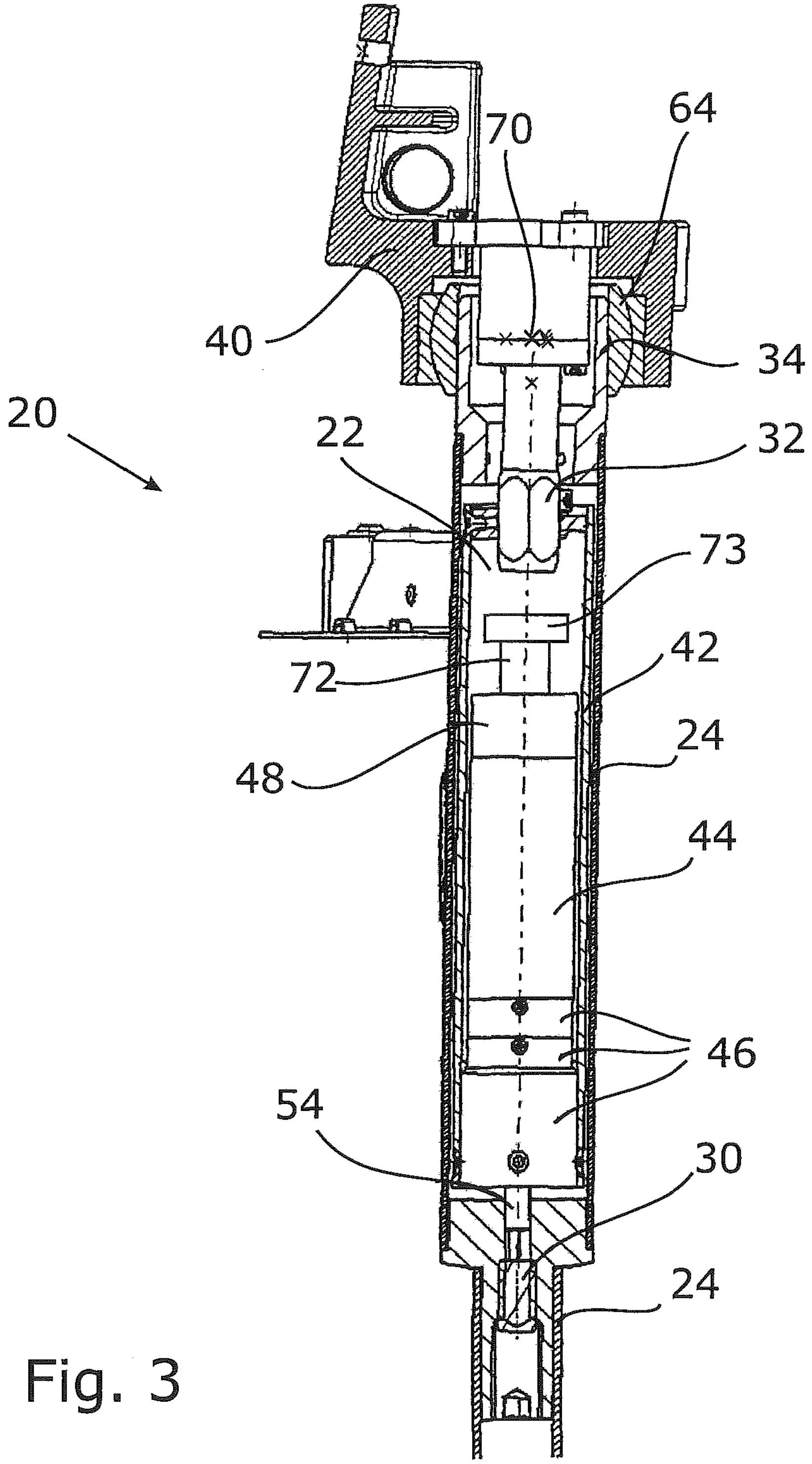
FIG. 3: shows a sectional view of a second embodiment of the support of the drive device.

FIG. 3 shows a second exemplary embodiment of the drive device 20; a coupling device 72 is not shown. In this case, the gear output shaft 54 acts as a guide shaft 32, protrudes into the bearing 34 and is non-rotatably mounted there. The housing of the planetary gear unit 46 is non-rotatably connected to the rotation post 24. If the drive motor is energized, the housing of the planetary gear unit 46 of the drive unit 22 also rotates, so that the rotation post 24 is made to rotate. In this embodiment, an external tube 42 (see FIG. 2) for the drive unit and a torque support (guide 66 in FIG. 4) in the region of the bearing 32 can be omitted.

All electrical and mechanical connector elements, e.g. a Bowden cable for manually unlocking the brake, if necessary, are disposed within the housing 22. If the drive device 20 is used, a sensor for detecting lift can also be used in a lift-and-turn unit.

The rotation post 24 is supported via the joint bearing 64, in which the rotation post 24 is able to rotate about the longitudinal axis Z-Z and compensate tumbling movements. In order for the tumbling movement of the rotation post 24 and of the drive unit 22 to be able to run synchronously, the ball receptacle 58 is disposed centrally in the Z-direction in the joint bearing 64. The rotation post 24 and the guide shaft 32 thus have a joint tumbling point 70, so to speak, which is disposed on the longitudinal axis Z-Z. In order to permit the drive unit 22 to slide in the Z-direction during tumbling, the guide shaft 32 is provided with a multi-edged geometry that can glide slidably in the Z-direction in a guide 66 and transmits the torque of the drive unit 22.

Figure 4:
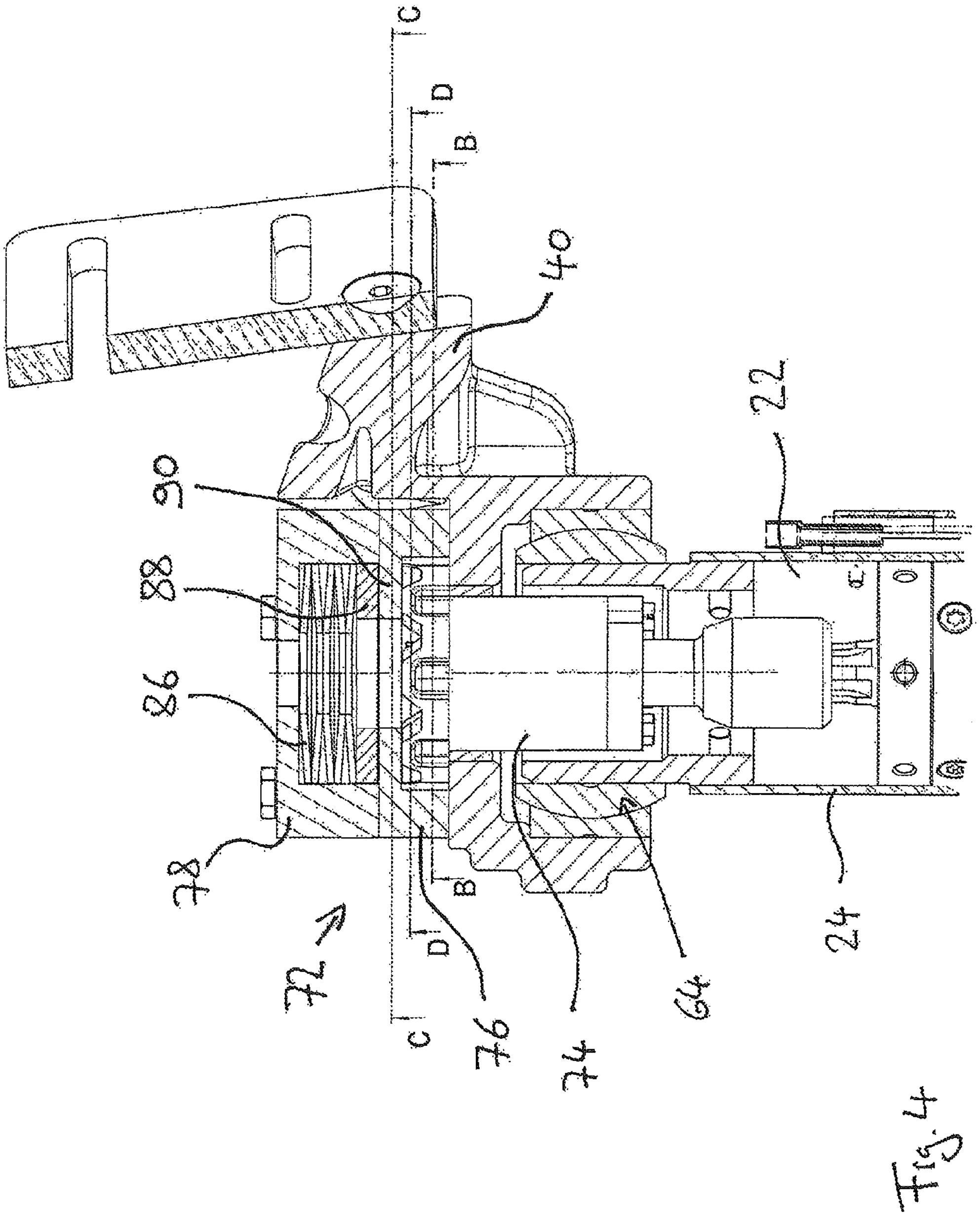
FIG. 4: shows a sectional view of a support of the drive devices with the coupling device according to the invention.

FIG. 4 shows the drive unit 22 being mounted on the retaining component 40 via a coupling device 72. A support member 74 is connected in a positive fit with the drive unit 22, and mounted rotatably, via a coupling bearing, on the retaining component 40, which is solidly connected to the vehicle. The coupling bearing comprises a bearing housing 76, which is disposed on the free end of the support member 74 and is thus located between the drive unit 22 or the bearing 34 and a coupling housing 78.

Figure 5:
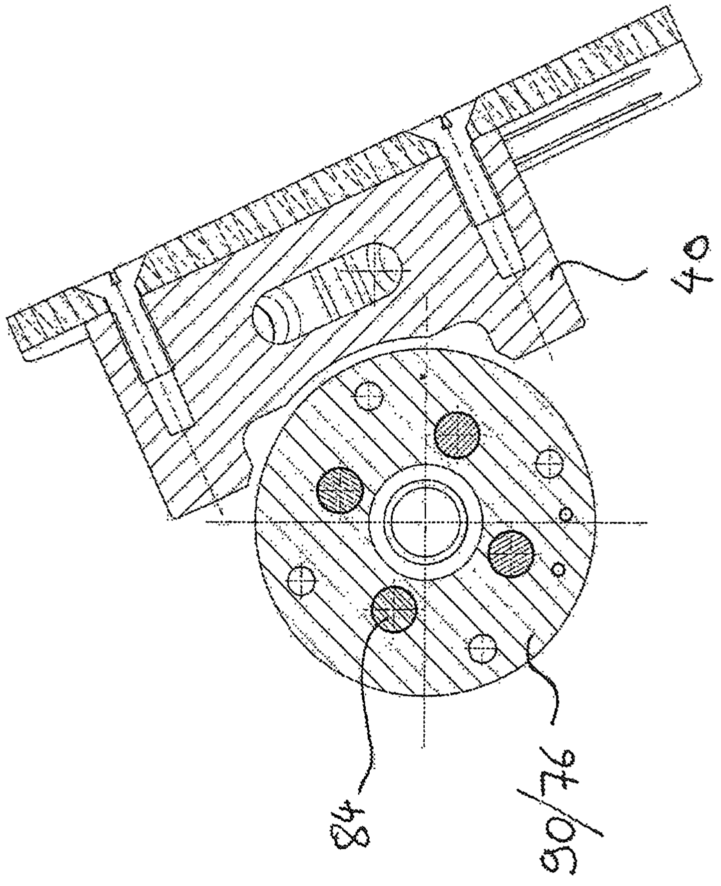
FIG. 5: shows a sectional view along the line of cut C-C from FIG. 4, FIG. 6: shows a sectional view according to the line of cut B-B from FIG. 4, FIG. 7: shows a sectional view according to the line of cut D-D from FIG. 4, FIG. 8: shows a first sectional view for illustrating the functional principle of the coupling device.
Figure 6:
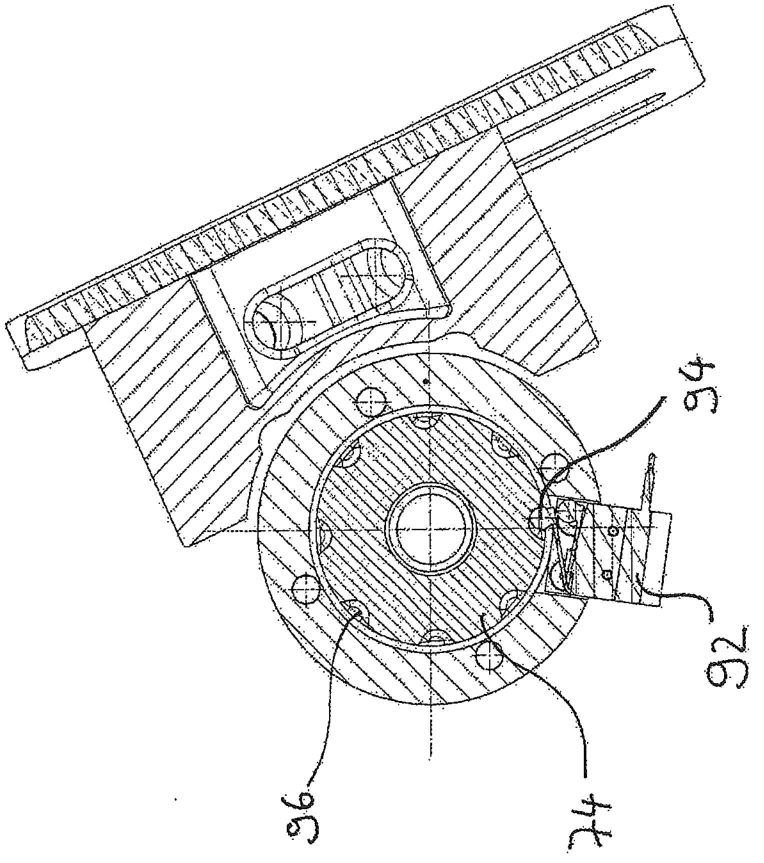
Figure 7:
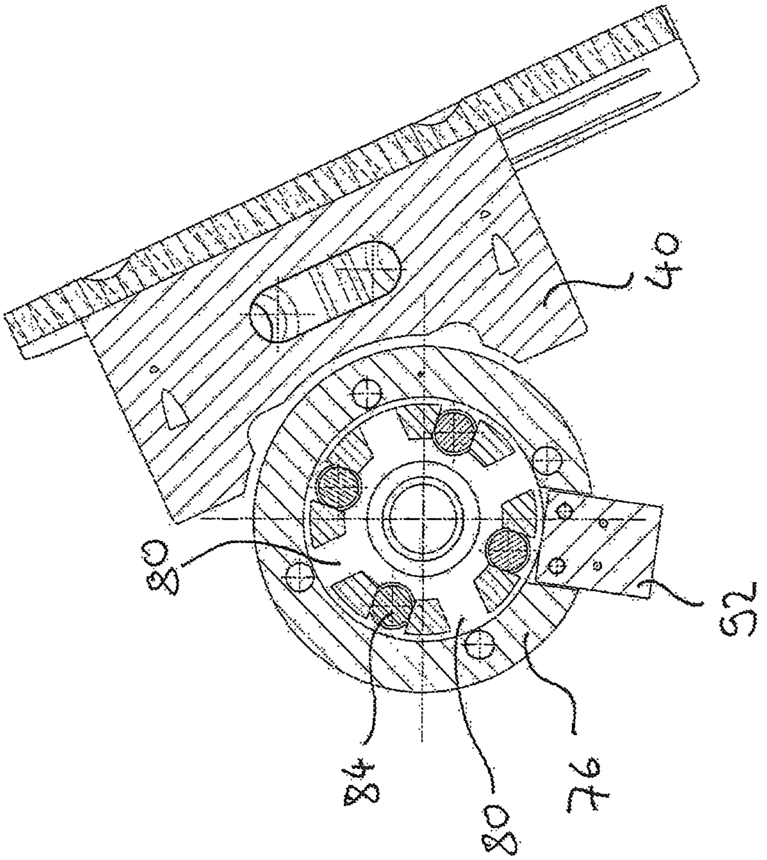

The sectional views of FIGS. 5, 6 and 7 illustrate the structure of the coupling device 72. The support member 74 has axially extending depressions 80, which in normal operation are aligned with two guides 82 that also extend axially and are disposed in the bearing housing 76. Coupling balls 84, which protrude into the guide 82 for transmitting the torque, are located in the depressions. Moreover, a disc spring 86 is disposed in the coupling housing 78 as a restoring force member, which exerts a force on the coupling balls 84 via a thrust plate 88 and pushes them into the depressions 80 or holds them there.

FIG. 4 shows that a horizontally extending ring portion 90 protrudes between the coupling balls 84 and the thrust plate 88.

FIG. 5 illustrates that the guides 82 extend axially through this ring portion 90 and that thus, the coupling balls 84 can come into contact with the thrust plate 88.

FIG. 6 shows a switching element 92 with a switching arm 94 which engages into the recesses 96 disposed on the outer circumference of the support member 74. If the support member 74 rotates, the switching arm 94 is moved and the switching element 92 is switched. The signal connected therewith can, for example, present the driver with a feedback with regard to vandalism, or be otherwise used.

Figure 8:
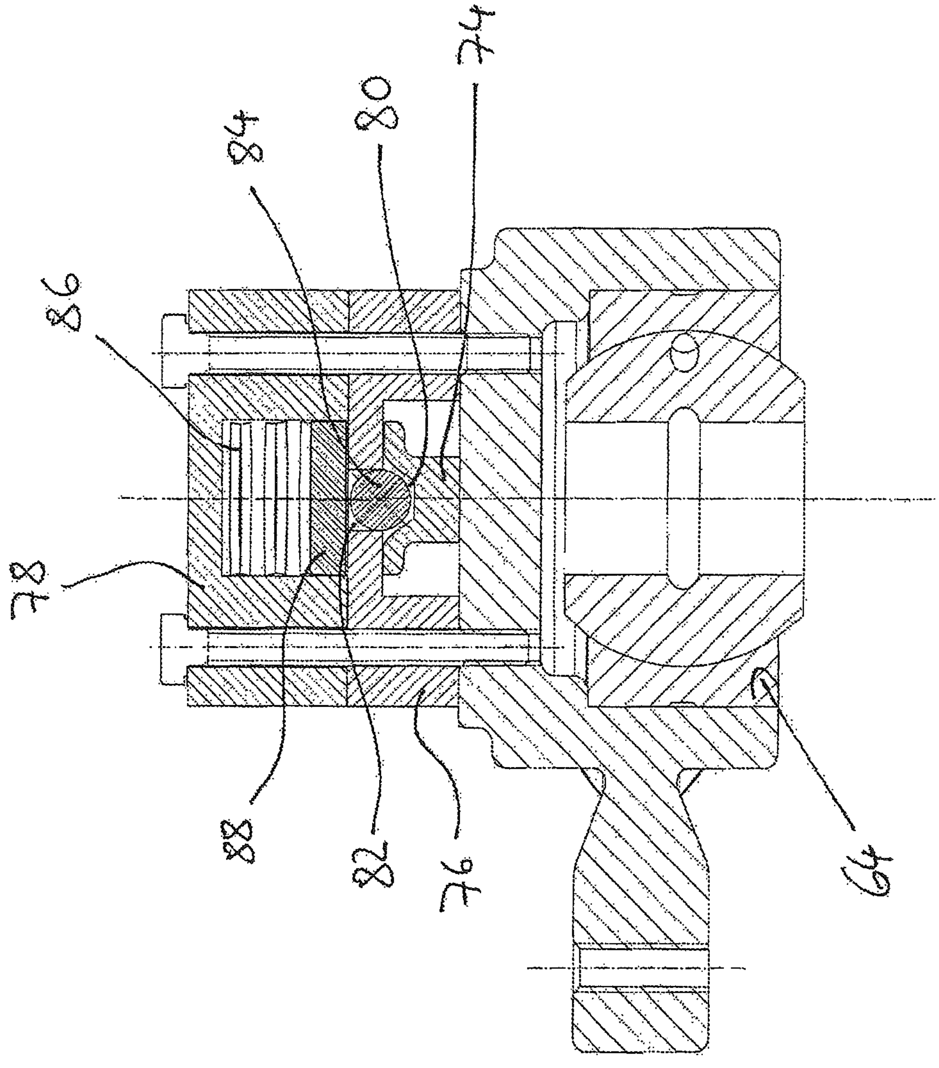
Figure 9:
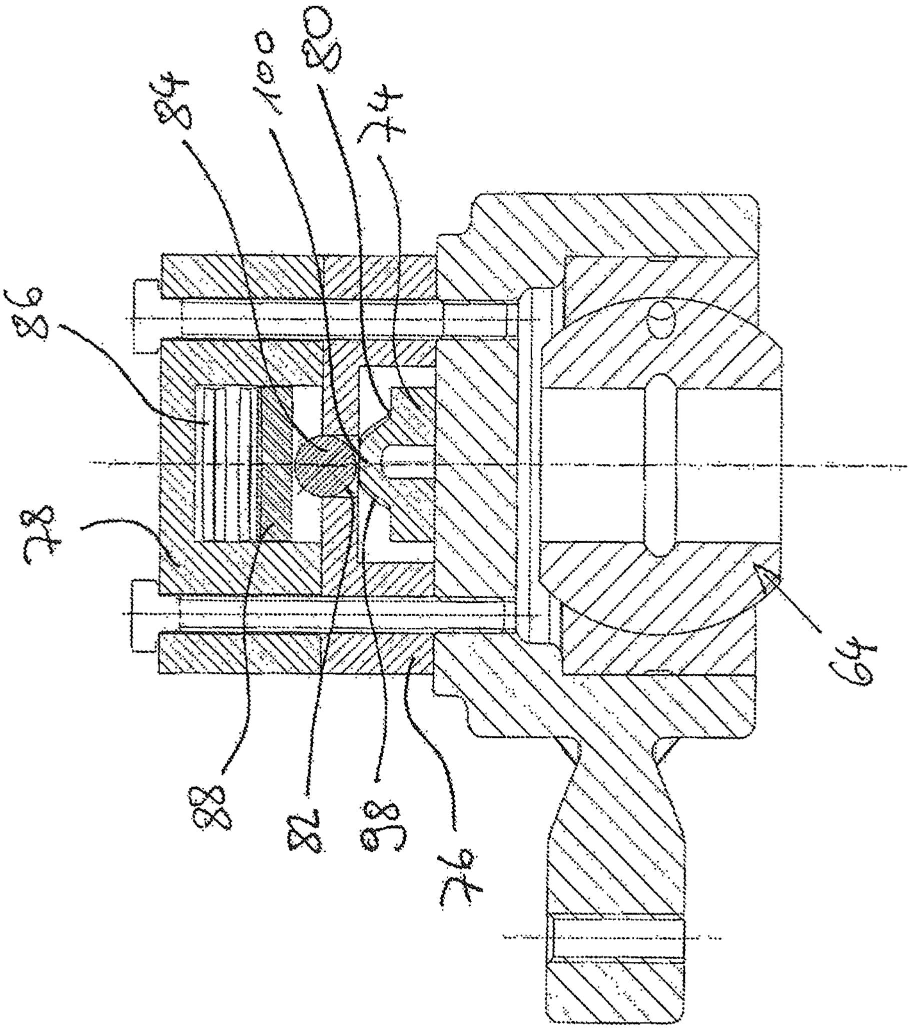
FIG. 9: shows a second sectional view illustrating the functional principle of the coupling device.

In a much simplified schematic view, the FIGS. 8 and 9 illustrate the mode of operation of the coupling device 72. Among other things, a coupling ball 84 can be recognized which in the normal state according to FIG. 8 is disposed in a depression 80 and protrudes into the guide 82. The thrust plate 88 holds the coupling ball 84 in the depression 80.

FIG. 9 shows the state which results when the threshold value of the applied torque is exceeded. The support member 74 has rotated and the coupling ball 84 has been driven upwards along a lateral flank 98 in the direction of the thrust plate 88. The torque has exceeded the restoring force of the disc spring 86, due to which the coupling ball 84 has rolled in the guide 82 to an apex 100 between two depressions 80. In this position, the support member 70 can rotate until a value below the threshold value is reached again and the coupling ball 84 is pressed back into one of the following depressions 80.

The invention is not limited to the exemplary embodiments described, but also includes other embodiments acting in an equivalent way. The description of the Figures merely serves for understanding the invention.

What is claimed is:

1. Drive device for boarding/deboarding devices for public transport vehicles, comprising:

a drive unit, which is disposed in and drives a rotation post that rotates about an axis of rotation during opening and closing processes and opens and closes the boarding/deboarding device, wherein the drive unit is retained by a retaining component on the vehicle and the retaining component acts as a counter bearing for a torque of the drive unit, and wherein a coupling device is disposed between the drive unit and the retaining component, the coupling device enabling a rotation of the drive unit about the axis of rotation when a threshold value of the torque acting on the drive unit is exceeded, wherein the coupling device is configured as a locking body coupling that comprises at least one first coupling element held in engagement with a second coupling element by a restoring force member, wherein a restoring force exerted by the restoring force member is overcome only when the threshold value of the torque acting on the drive unit is exceeded and the coupling elements are thereby brought out of engagement, and wherein additional bodies are disposed between the coupling elements which transmit the torque.

2. Drive device according to claim 1, wherein the first coupling element is formed by a support member which comprises at least one axially extending first depression with lateral flanks extending obliquely in the circumferential direction of the drive unit, the second coupling element is formed by a bearing housing comprising at least one axially extending guide, a coupling ball is disposed in the axial depression which protrudes into the guide and is thus axially guided, wherein the coupling ball, during rotation of the drive unit, is moved over the obliquely extending lateral flank of the depression against the restoring force of the restoring force member.

3. Drive device according to claim 2, wherein the restoring force member is formed by a disc spring acting on a thrust plate disposed between the coupling ball and the disc spring.

4. Drive device according to claim 1, wherein a bearing, which enables the rotation post to tumble, is provided between the drive unit and the retaining component.

5. Drive device according to claim 4, wherein a guide shaft extends from the drive unit into the bearing and comprises receptacles for receiving balls disposed in depressions of the ball receptacle of the bearing, wherein the depressions permit a movement of the balls in a longitudinal direction, so that the guide shaft is mounted in the ball receptacle so as to be moveable in the Z-direction via the balls, but non-rotatable about the longitudinal axis.

6. Drive device according to claim 5, wherein the rotation post is supported in a joint bearing which surrounds the ball receptacle, wherein the guide shaft and the rotation post tumble about a common tumbling point disposed on the longitudinal axis.

7. Drive device according to claim 6, wherein the guide shaft is non-rotatably connected to the drive unit.

8. Drive device according to claim 5, wherein the guide shaft corresponds to the output shaft of a drive motor.

9. Drive device according to claim 5, wherein the guide shaft corresponds to a gear unit input shaft.

10. Drive device according to claim 1, wherein the drive unit is configured to be self-locking.

11. Drive device for boarding/deboarding devices for public transport vehicles, comprising:

a drive unit, which is disposed in and drives a rotation post that rotates about an axis of rotation during opening and closing processes and opens and closes the boarding/deboarding device, wherein the drive unit is retained by a retaining component on the vehicle and the retaining component acts as a counter bearing for a torque of the drive unit, wherein a coupling device is disposed between the drive unit and the retaining component, the coupling device enabling a rotation of the drive unit about the axis of rotation when a threshold value of the torque acting on the drive unit is exceeded, wherein the coupling device is configured as a locking body coupling that comprises at least one first coupling element held in engagement with a second coupling element by a restoring force member, wherein a restoring force exerted by the restoring force member is overcome only when the threshold value of the torque acting on the drive unit is exceeded and the coupling elements are thereby brought out of engagement, wherein additional bodies are disposed between the coupling elements which transmit the torque, and the first coupling element is formed by a support member which comprises at least one axially extending first depression with lateral flanks extending obliquely in the circumferential direction of the drive unit, the second coupling element is formed by a bearing housing comprising at least one axially extending guide, a coupling ball is disposed in the axial depression which protrudes into the guide and is thus axially guided, wherein the coupling ball, during rotation of the drive unit, is moved over the obliquely extending lateral flank of the depression against the restoring force of the restoring force member.

* * * * *